(12) United States Patent
Gattineri

(10) Patent No.: US 9,521,930 B2
(45) Date of Patent: Dec. 20, 2016

(54) COOKING TOOL

(71) Applicant: Mary Gattineri, Winchester, MA (US)

(72) Inventor: Mary Gattineri, Winchester, MA (US)

(*) Notice: Subject to any disclaimer, the term of this patent is extended or adjusted under 35 U.S.C. 154(b) by 72 days.

(21) Appl. No.: 13/782,565

(22) Filed: Mar. 1, 2013

(65) Prior Publication Data
US 2014/0143957 A1 May 29, 2014

Related U.S. Application Data

(63) Continuation-in-part of application No. 13/688,394, filed on Nov. 29, 2012, now abandoned.

(51) Int. Cl.
*A47J 43/28* (2006.01)

(52) U.S. Cl.
CPC .................... *A47J 43/288* (2013.01)

(58) Field of Classification Search
CPC ........... A47J 43/288; A47J 43/10; A47J 43/28
USPC .. 7/110; 30/123, 324; 99/348, 357; 366/129, 342, 343; D7/638, 643, 644, 688, D7/376
See application file for complete search history.

(56) References Cited

U.S. PATENT DOCUMENTS

| | | | | | |
|---|---|---|---|---|---|
| D22,407 | S | * | 5/1893 | Hinde | D7/644 |
| 887,790 | A | * | 5/1908 | Griswold | 30/123 |
| D58,223 | S | * | 6/1921 | Goldsmith | D7/682 |
| D156,850 | S | * | 1/1950 | Shirley | D10/46.3 |
| 2,654,252 | A | * | 10/1953 | Davis | 73/426 |
| 2,683,374 | A | * | 7/1954 | Finley | 73/426 |
| 5,947,595 | A | * | 9/1999 | Eurisch et al. | 366/129 |
| 8,091,242 | B2 | * | 1/2012 | Teys et al. | 30/324 |
| 2005/0138736 | A1 | * | 6/2005 | Tarlow | 7/110 |
| 2012/0198700 | A1 | * | 8/2012 | Cotter et al. | 30/123 |

* cited by examiner

*Primary Examiner* — David B Thomas
(74) *Attorney, Agent, or Firm* — Douglas Denninger

(57) ABSTRACT

A cooking tool having different features for measuring and mixing, including an elongated shaft having a central handle region, a first mixing portion such as a spoon at one end and a second mixing portion such as a whisk at another end, the first and second mixing portions being different from each other. Preferably, at least one of the first and second mixing portions defines a first measuring feature and the central handle region defines at least one measuring feature which differs from the first measuring feature.

19 Claims, 3 Drawing Sheets

COOKING TOOL

CROSS-REFERENCE TO RELATED APPLICATION

This application claims priority to U.S. Non-Provisional application Ser. No. 13/688,394 filed Nov. 29, 2012.

FIELD OF THE INVENTION

This invention relates to devices for preparing foods and more particularly to tools having multiple features for measuring and combining ingredients.

BACKGROUND OF THE INVENTION

Various types of baking and cooking tools are used by individuals and companies to prepare food items such as cookies, brownies, cakes, pies, dessert bars, bread loaves, soups, main courses and appetizers. However, it is often difficult to find the proper tool for a particular measuring or mixing task during the food preparation and cooking process.

It is therefore desirable to have a cooking tool which is more convenient to use and has multiple capabilities.

SUMMARY OF THE INVENTION

An object of the present invention is to provide a cooking tool which reliably measures different amounts of food ingredients.

Another object of the present invention is to provide such a cooking tool which facilitates different mixing techniques.

A further object of the invention is to reduce clutter in a kitchen or other food preparation area This invention features a cooking tool having different features for measuring and mixing, including an elongated shaft having a central handle region, a first mixing portion such as a spoon at one end and a second mixing portion such as a whisk or spatula at another end, the first and second mixing portions being different from each other. Preferably, at least one of the first and second mixing portions defines a first measuring feature and the central handle region defines at least one measuring feature which differs from the first measuring feature.

In some embodiments, the central handle region defines at least two measuring features which differ from each other and from the first measuring feature. In certain embodiments, the central handle region defines at least one depression to serve as one measuring feature and defines at least one raised feature to serve as a different measuring feature. In a number of embodiments, the at least one raised feature includes a series of raised graduations such as graduations to delineate tablespoons of butter along a stick of butter.

In certain embodiments, the tool includes at least one grating feature, such as a plurality of grating features disposed on at least one of upper and lower surfaces of a whisk. In some embodiments, the tool further includes a plurality of raised features capable of marking goods for baking, such as alternating "X" and "O" characters.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

This invention may be accomplished by a cooking tool having different features for measuring and mixing, including an elongated shaft having a central handle region, a first mixing portion such as a spoon at one end and a second mixing portion such as a whisk or spatula at another end, the first and second mixing portions being different from each other. Preferably, at least one of the first and second mixing portions defines a first measuring feature and the central handle region defines at least one measuring feature which differs from the first measuring feature.

Figure 1:
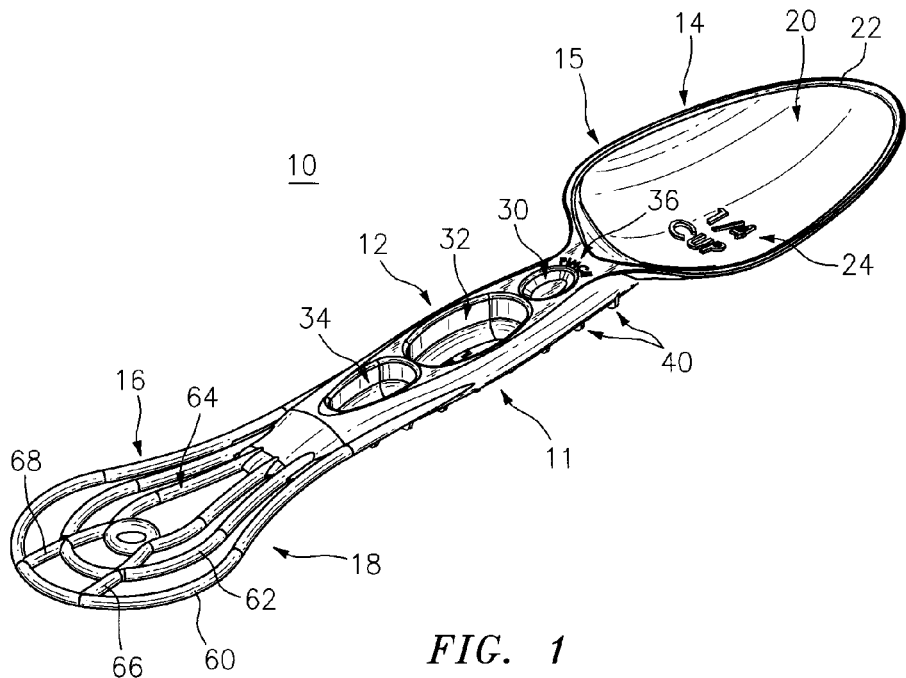
FIG. 1 is an upper perspective view of a cooking tool according to the present invention having a measuring spoon and a whisk.
Figure 2:
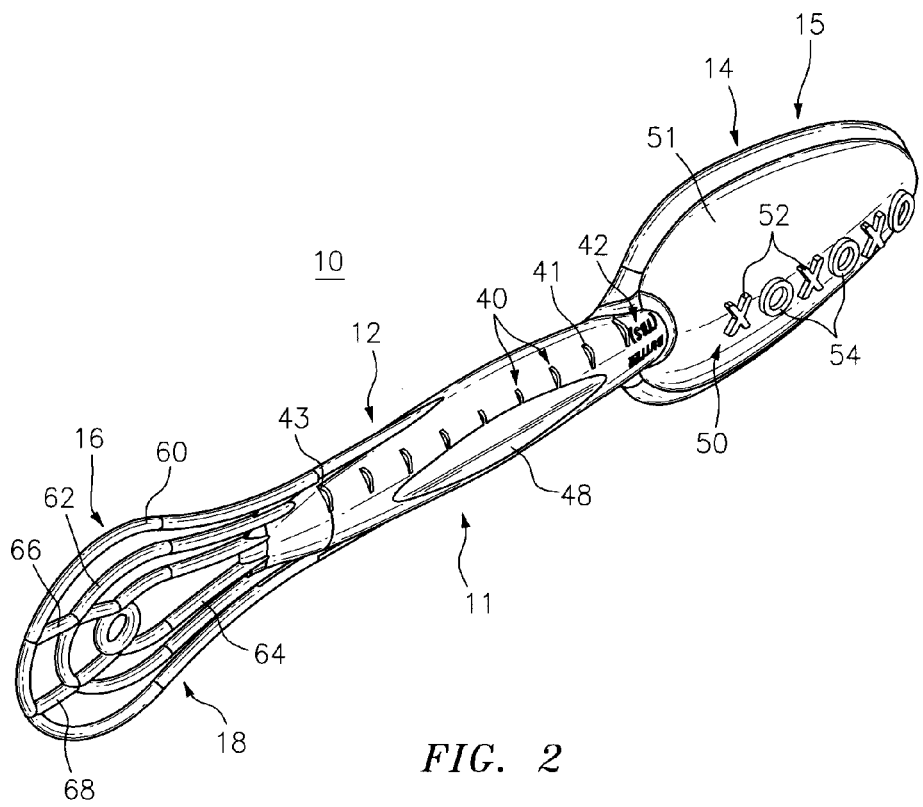
FIG. 2 is a lower perspective view of the tool of FIG. 1.
Figure 3:
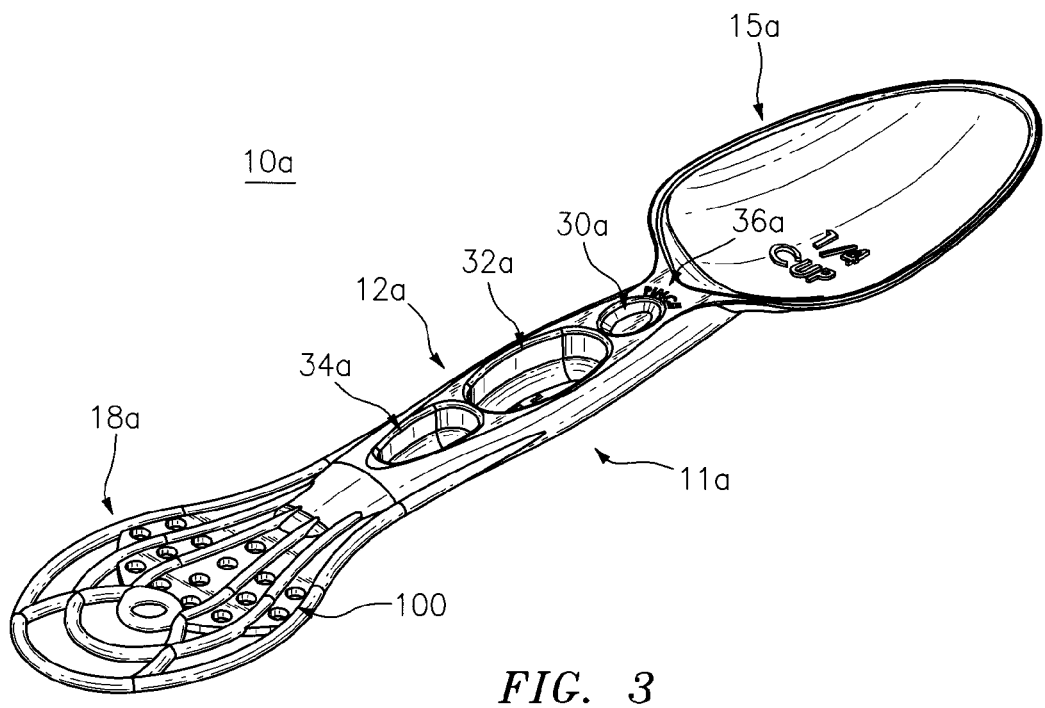
FIG. 3 is an upper perspective view of another cooking tool according to the present invention having grating features on a whisk.
Figure 4:
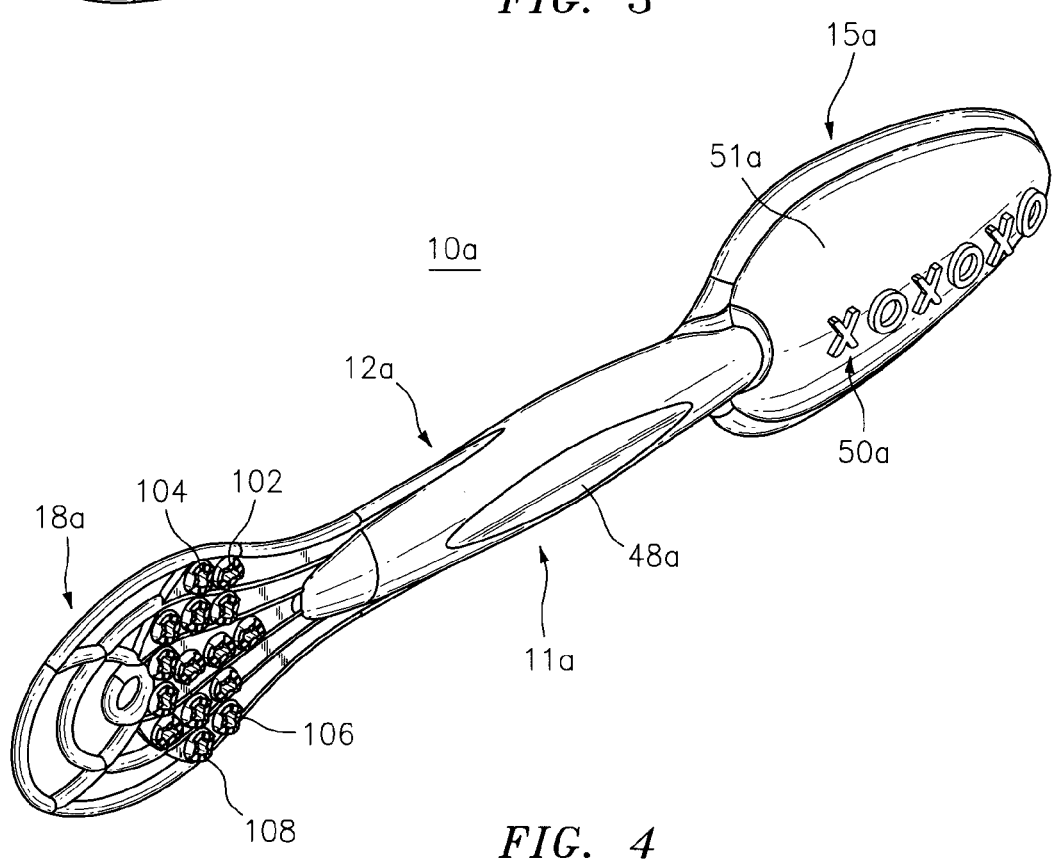
FIG. 4 is a lower perspective view of the tool of FIG. 3.

A cooking tool 10, FIGS. 1 and 2, according to the present invention includes an elongated shaft 11 having a central handle region 12, a first mixing portion 14 with a mixing implement such as a spoon 15 at one end and a second mixing portion 16 with a mixing implement such as a whisk 18 at another end. In this construction, spoon 15 defines a basin 20, FIG. 1, surrounded by a rim 22 to define a unit of measure such as a fraction of a cup. Corresponding indicia 24 preferably indicates the unit of measure as "¼ CUP" in this construction.

The central handle region 12 defines three different measuring features 30, 32 and 34 which differ from each other and from the first measuring feature of basin 20. In this construction, the central handle region defines measuring features 30, 32 and 34 as depressions, also referred to as compartments, which are fully below the surface of central handle 12 to serve measurements for a "pinch", ½ tablespoon and ½ teaspoon, respectively. Corresponding indicia 36 for "PINCH", "½ Tbs" and "½ Tsp" preferably are provided next to or inside of the respective depressions or compartments. In other constructions, the measuring features 30, 32 and/or 34 are formed at least partially or completely by raised walls or other retention members.

Tool 10 includes at least one raised feature 40 to serve as a different measuring feature. Raised feature 40 includes a series of raised graduations such as measurement graduations 41 to 43 to delineate tablespoons of butter along a stick of butter or to obtain exact pieces for lattice in pie making or cookie sticks. The graduations can be metric or English-type units of measure. In this construction, indicia 42 of "BUTTER (TBS)" indicates one tablespoon of butter between each graduation 40 when tapped or pressed against a stick of butter after any covering over the butter has been removed to expose the butter to the tool 10.

Tool 10 includes a flattened surface 48 in this construction to stabilize tool 10 with measuring basin 20 and measuring compartments 30, 32 and 34 facing uniformly upward when flattened surface 40 is placed against a countertop or other substantially flat surface.

In this construction, the tool 10 further includes a plurality of raised features 50, defined on lower surface 51 of spoon 15, capable of marking goods for baking, such as alternating "X" and "O" characters 52 and 54, to tine or crimp a pie or to decorate cinnamon sticks, bread sticks or cookies, for example.

Figures 5, 6, 7:
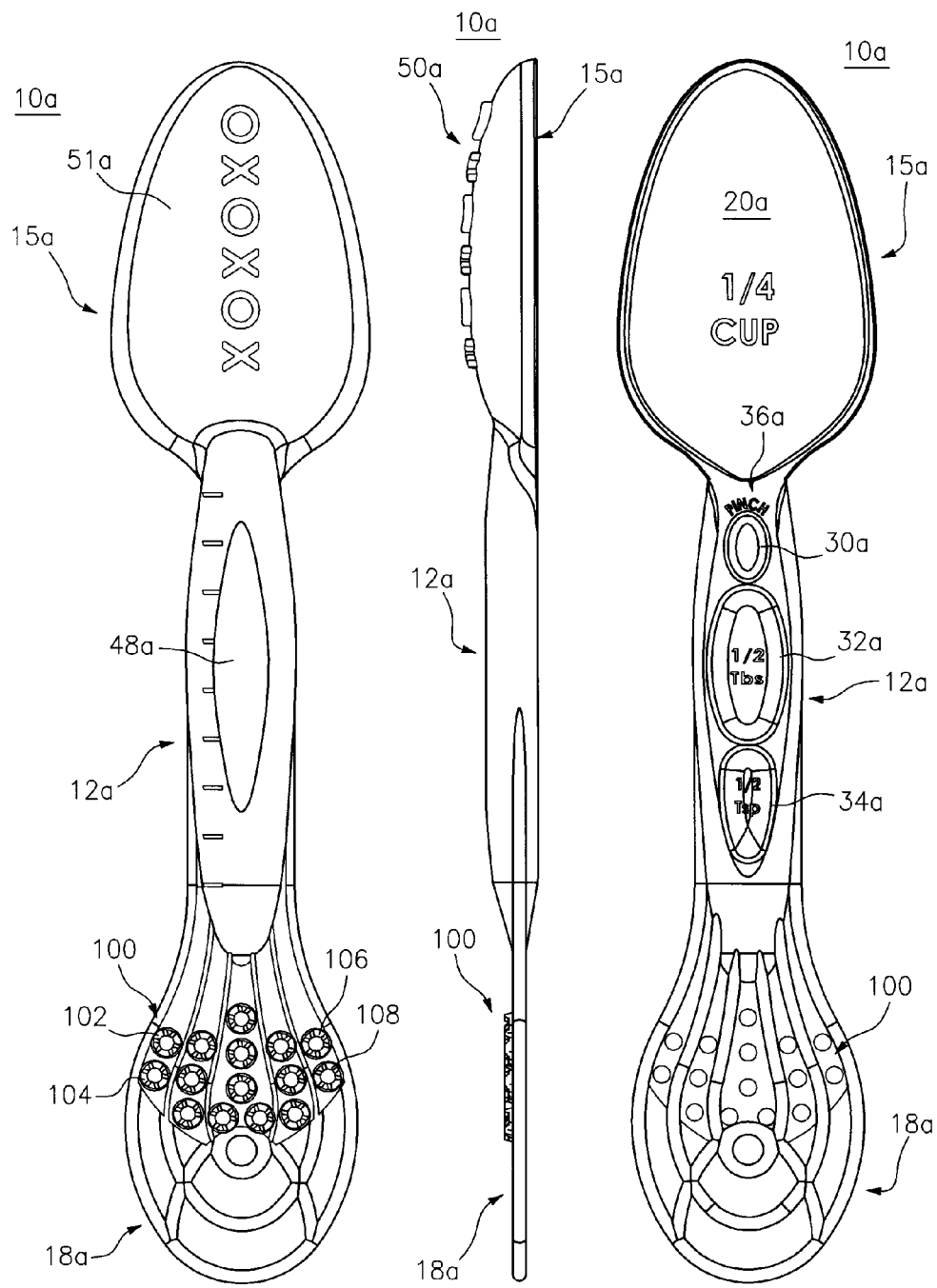
FIG. 5 is a bottom view of the tool of FIG. 3.
FIG. 6 is a left side view of the tool of FIG. 3.
FIG. 7 is a top view of the tool of FIG. 3.

Whisk 18 is formed from curved concentric ribs 60, 62 and 64 with supporting webs 66 and 68 with open spaces defined therebetween. In this construction, whisk 18 is substantially planar, such as shown for whisk 18a in FIG. 6 below.

It is preferable for tools according to the present invention to be formed of a non-toxic material that is dishwasher-safe. There are a number of suitable polymeric materials which can be injection molded to form the various measuring and mixing features described herein. Two or more materials can be utilized e.g. one or more softer, more flexible, elastomeric materials for a scraper-type spatula in second portion 16 with one or more stiffer materials for handle 12 and/or spoon 15.

Another tool 10a, FIGS. 3-7, according to the present invention includes a number of features which are similar to those of tool 10, as represented by similar reference numbers, plus at least one grating feature 100, such as a plurality of substantially cylindrical graters 102, 104 to 106, 108 disposed on at least one of upper and lower surfaces of a whisk. Graters 102-108, each terminating in a plurality of teeth-like projections, define passages therethrough in this construction, which are visible in FIGS. 3 and 7 as holes 110.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A cooking tool having different features for measuring and mixing, comprising:
    an elongated shaft having a central handle region, a first mixing portion at one end and a second mixing portion at another end, the first and second mixing portions being different from each other;
    at least one of the first and second mixing portions defining a first measuring feature; and
    the central handle region defining at least one measuring feature which differs from the first measuring feature, wherein the second mixing portion includes a whisk.

2. The tool of claim 1 wherein the central handle region defines at least two measuring features which differ from each other and from the first measuring feature.

3. The tool of claim 1 wherein the central handle region defines at least one depression to serve as one measuring feature and defines at least one raised feature to serve as a different measuring feature.

4. The tool of claim 3 wherein the at least one raised feature includes a series of raised graduations.

5. The tool of claim 4 wherein the series of raised graduations delineates tablespoons of butter.

6. The tool of claim 1 wherein the first mixing portion is a spoon.

7. The tool of claim 6 wherein the spoon is configured to serve as the first measuring feature.

8. The tool of claim 1 further including at least one grating feature.

9. The tool of claim 1 wherein the whisk is substantially planar having an upper surface and a lower surface, and a plurality of grating features are disposed on at least one of the upper and lower surfaces.

10. The tool of claim 1 further including a plurality of raised features capable of marking goods for baking.

11. The tool of claim 10 wherein the plurality of raised features includes alternating "X" and "O" characters.

12. A cooking tool having different features for measuring and mixing, comprising:
    an elongated shaft having a central handle region, a spoon portion at one end and a whisk portion at another end; and
    the central handle region defining at least two depressions to serve as measuring features which differ from each other.

13. The tool of claim 12 wherein the central handle region further defines at least one raised feature to serve as a different measuring feature.

14. The tool of claim 13 wherein the at least one raised feature includes a series of raised graduations.

15. The tool of claim 12 wherein the whisk is substantially planar with an upper surface and a lower surface, and a plurality of grating features are disposed on at least one of the upper and lower surfaces.

16. The tool of claim 12 further including a plurality of raised features capable of marking goods for baking.

17. A cooking tool having different features for measuring and mixing, comprising:
    an elongated shaft having a central handle region, a spoon portion at one end and a whisk portion at another end;
    the spoon being configured to serve as a first measuring feature; and
    the central handle region defining at least three depressions to serve as measuring features which differ from each other and from the first measuring feature.

18. The tool of claim 17 wherein the whisk is substantially planar with an upper surface and a lower surface, and a plurality of grating features are disposed on at least one of the upper and lower surfaces.

19. The tool of claim 17 wherein the spoon defines a plurality of raised features capable of marking goods for baking.

* * * * *